(12) United States Patent
Kato et al.

(10) Patent No.: US 7,278,333 B2
(45) Date of Patent: Oct. 9, 2007

(54) BALL SCREW DEVICE

(75) Inventors: Masato Kato, Gunma (JP); Takayuki Yabe, Gunma (JP); Junji Minakuchi, Gunma (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 0 days.

(21) Appl. No.: 11/109,709

(22) Filed: Apr. 20, 2005

(65) Prior Publication Data
US 2005/0252324 A1 Nov. 17, 2005

(30) Foreign Application Priority Data
Apr. 21, 2004 (JP) .................. P. 2004-125528

(51) Int. Cl.
*F16H 3/06* (2006.01)
(52) U.S. Cl. .................. 74/89.44; 74/89.4; 184/5
(58) Field of Classification Search .............. 74/89.44, 74/89.4, 424.71, 467; 277/500, 549, 551, 277/628, 630, 637
See application file for complete search history.

(56) References Cited
U.S. PATENT DOCUMENTS
4,407,511 A * 10/1983 Benton et al. .............. 277/354
4,905,533 A * 3/1990 Benton et al. .............. 74/89.4
5,906,136 A * 5/1999 Yabe et al. .............. 74/424.72
6,450,295 B1 * 9/2002 Tsukada et al. .............. 184/5
6,634,246 B2 * 10/2003 Ohya et al. .............. 74/89.44

FOREIGN PATENT DOCUMENTS

| JP | 63-149465 A | 6/1988 |
|---|---|---|
| JP | 6-11436 Y2 | 3/1994 |
| JP | 10-184683 A | 7/1998 |
| JP | 2000-81103 A | 3/2000 |
| JP | 2003-172426 A | 6/2003 |
| JP | 2005042746 | * 2/2005 |

* cited by examiner

*Primary Examiner*—Richard Ridley
*Assistant Examiner*—Matthew A. Johnson
(74) *Attorney, Agent, or Firm*—Sughrue Mion Pllc.

(57) ABSTRACT

A ball screw device has a screw shaft which has a shaft rolling groove in a spiral shape formed on an outer surface of the screw shaft, a nut which has a nut rolling groove formed on an inner surface of the nut and opposed to the shaft rolling groove, wherein the screw shaft is to be screwed in the nut so that the shaft rolling groove and the nut rolling groove are faced through a plurality of rolling balls, and a lubrication ring which is made of a lubricant-including material, comes in slide contact with the screw shaft, and is arranged in an end portion of the nut, wherein a non-contact portion, which does not come in slide contact with the screw shaft, is formed on the slide contact surface of the lubrication ring.

2 Claims, 4 Drawing Sheets

BALL SCREW DEVICE

CROSS-REFERENCE TO RELATED APPLICATIONS

This application is based upon and claims the benefit of priority from the prior Japanese Patent Applications No. 2004-125528 filed on Apr. 21, 2004, the entire contents of which are incorporated herein by reference.

BACKGROUND OF THE INVENTION

1. Field of the Invention

The present invention relates to a ball screw device used in a feed mechanism, etc. of a moving body of a machine tool, a precision machine, etc., and particularly used in a feed mechanism of high speed, etc.

2. Description of the Related Art

The ball screw device is generally coated with a lubricant of grease, etc. and is smoothly operated by forming an oil film between a shaft rolling groove of a screw shaft, a nut rolling groove of a nut and a rolling ball. However, the function of grease, etc. as the lubricant is reduced in a comparatively short period by the influences of temperature, moisture, foreign matters, etc. Therefore, it is necessary to periodically make a replenishing work of the grease, etc.

In the related ball screw device, the shaft rolling groove of a spiral shape arranged in the screw shaft and the nut rolling groove opposed to the shaft rolling groove and arranged in the nut are screwed through the rolling ball so as to solve such complicatedness of the replenishing work. Further, a lubrication ring in an annular shape constructed by a lubricant-including polymer having a resin material comparatively rich in elasticity as a base material is arranged in an end portion of the nut. The inner surface of this lubrication ring comes in slide contact with the outer surface of the screw shaft and the screw shaft is lubricated. Further, the invasion of foreign matters such as dust, etc. is prevented by a seal body arranged outside the lubrication ring (e.g., see JP-A-2000-81103).

JP-A-2000-81103 (paragraph 0020 of page 3 to paragraph 0037 of page 5, and FIGS. 1 and 2) is referred to as a related art.

However, in the above related art, the seal body for preventing the invasion of the foreign matters is arranged so as to come in slide contact with the outer surface of the screw shaft. Therefore, the lubricant exuded from the lubrication ring including the lubricant is scraped by the seal body, and the lubricating state of a slide contact surface of the lubrication ring made of a material comparatively rich in elasticity becomes unstable. Therefore, there is a case in which a stick slip phenomenon is generated. In this stick slip phenomenon, deformation due to catching in a part insufficient in the lubricant and restoration due to the elasticity of the lubrication ring are discontinuously caused.

This phenomenon is not generated when the screw shaft is rotated at low speed. However, when the screw shaft is rotated at high speed and is suddenly accelerated and decelerated, this phenomenon is easily generated. When this phenomenon is generated, a self-excited vibration is caused by this phenomenon and an abnormal sound is generated.

SUMMARY OF THE INVENTION

An object of the invention is to provide a ball screw device that prevents the generation of abnormal sounds of a lubrication ring when the ball screw device is used at high speed.

The invention provides a ball screw device, having; a screw shaft which has a shaft rolling groove in a spiral shape formed on an outer surface of the screw shaft; a nut which has a nut rolling groove formed on an inner surface of the nut and opposed to the shaft rolling groove, wherein the screw shaft is to be screwed in the nut so that the shaft rolling groove and the nut rolling groove are faced through a plurality of rolling balls; and a lubrication ring which is made of a lubricant-including material, comes in slide contact with the screw shaft, and is arranged in an end portion of the nut, wherein a non-contact portion, which does not come in slide contact with the screw shaft, is formed on the slide contact surface of the lubrication ring.

The non-contact portion is formed in the lubrication ring made of the lubricant-including material, and the lubrication ring comes in slide contact with the screw shaft. According to the ball screw device, since the contact area of the slide contact surface with the screw shaft is reduced, its frictional force is reduced and the non-contact portion can function as an oil reservoir of the exuded lubricant. Thus, when the screw shaft is rotated at high speed and is suddenly accelerated and decelerated, the generation of the stick slip phenomenon is restrained and the generation of an abnormal sound can be prevented.

DETAILED DESCRIPTION OF THE PREFERRED EMBODIMENTS

The embodiments of a ball screw device in the present invention will next be explained with reference to the drawings.

Embodiment 1

Figure 1:
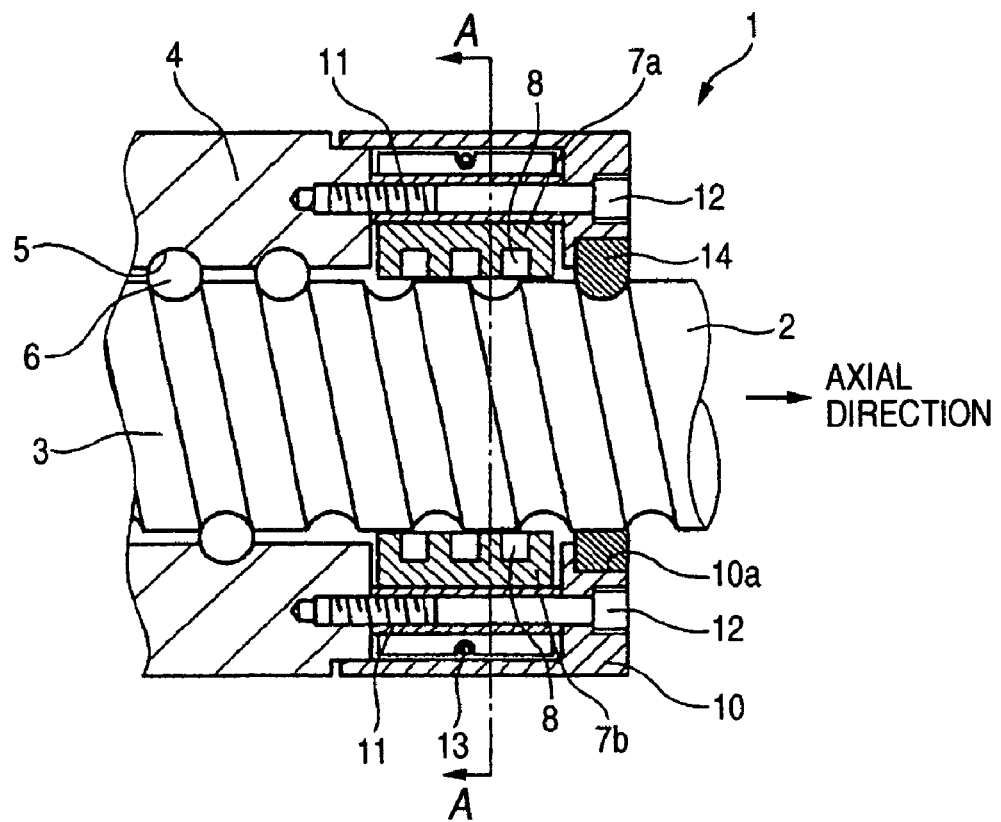
FIG. 1 is a partial sectional view showing a ball screw device of an embodiment.
Figure 2:
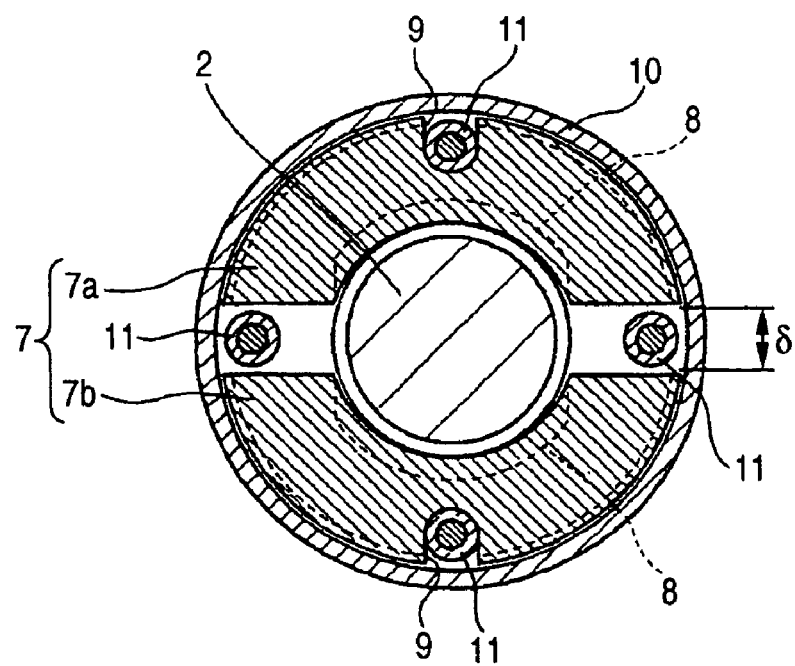
FIG. 2 is an A-A sectional view of FIG. 1.
Figure 3:
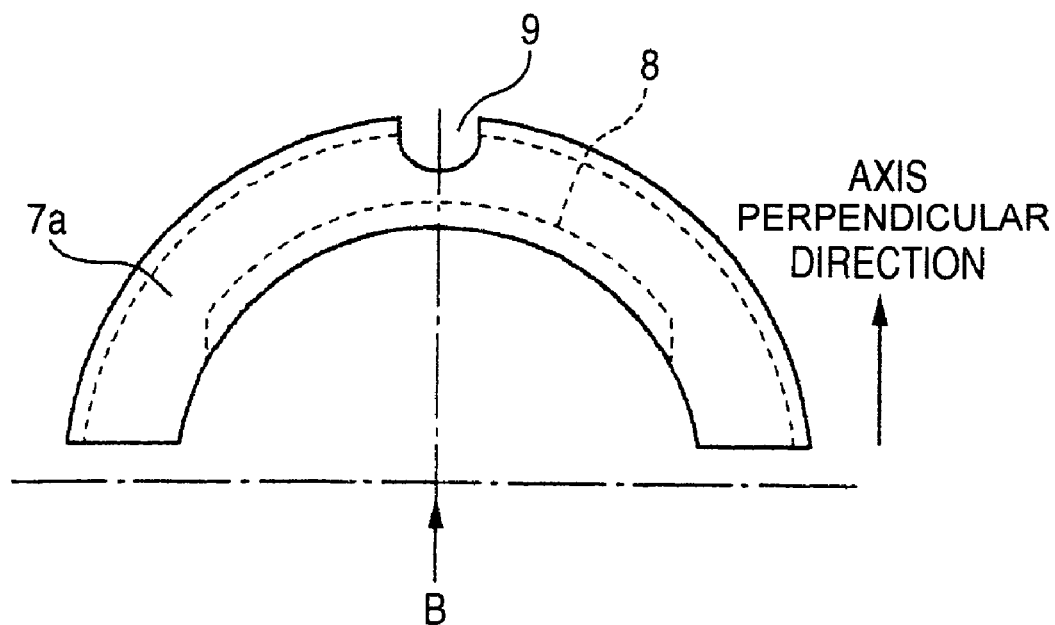
FIG. 3 is a front view showing a ring piece of the embodiment.
Figure 4:
FIG. 4 is a view seen from an arrow B of FIG. 3.

FIG. 1 is a partial sectional view showing a ball screw device of an embodiment. FIG. 2 is an A-A sectional view of FIG. 1. FIG. 3 is a front view showing a ring piece of the embodiment. FIG. 4 is a view seen from an arrow B of FIG. 3.

In FIGS. 1 and 2, reference numeral 1 designates the ball screw device.

Reference numeral 2 designates a screw shaft of the ball screw device 1. The screw shaft 2 is manufactured by a steel material such as alloy steel, etc., and a shaft rolling groove 3 approximately having a semi-arc shape is formed in a spiral shape at a predetermined pitch on the outer surface of the screw shaft 2.

Reference numeral 4 designates a nut of the ball screw device 1. The nut 4 is manufactured by a steel material such as alloy steel, etc., and a nut rolling groove 5 approximately having a semi-arc shape and opposed to the shaft rolling groove 3 is formed on the inner surface of the nut 4.

Reference numeral 6 designates a rolling ball manufactured by a steel material such as alloy steel, etc. or a ceramic material, etc.

Reference numeral 7 designates a lubrication ring. As shown in FIG. 2, the end surfaces of both the sides of ring pieces 7a, 7b approximately having a semi-cylindrical shape are opposed to each other through a constant clearance 6 so that the lubrication ring 7 is approximately formed in an annular shape. The lubrication ring 7 is arranged in an end portion of one side or both sides of the nut 4.

This lubrication ring 7 is manufactured by molding a lubricant-including material such as a lubricant-including polymer, etc. described later by a molding means of injection molding, etc. so as to exude the lubricant by frictional heat, etc. due to slide contact with the screw shaft 2 to supply the lubricant.

Reference numeral 8 designates a non-contact portion. This non-contact portion 8 is arranged on each of the inner surfaces of the ring pieces 7a, 7b. This inner surface is formed as a groove of a slit shape of the circumferential direction dug in the direction perpendicular to the axial direction of the screw shaft 2. Plural non-contact portions 8 are arranged in the axial direction on the inner surfaces of the ring pieces 7a, 7b.

Reference numeral 9 designates an engaging groove. The engaging groove 9 is an axial groove in which the outer surface side is opened near the top portions of the outer surfaces of both the ring pieces 7a, 7b and is notched in a semi-elliptical shape.

Reference numeral 10 designates a seal cap manufactured by a metallic material, a resin material, etc. The seal cap 10 is fixed to the end portion of the nut 4 by a bolt 12 through a sleeve 11, and the lubrication ring 7 is arranged within the seal cap 10.

As shown in FIG. 2, the outside diameter of this sleeve 11 is formed so as to be smaller than the clearance δ. A predetermined clearance is formed between both the end portions of the ring pieces 7a, 7b. On the other hand, the sleeve 11 engaged with the engaging groove 9 of each of the ring pieces 7a, 7b has a function for stopping the rotation of each of the ring pieces 7a, 7b.

The entire length of the sleeve 11 is formed so as to be greater than the axial length of the lubrication ring 7. When the seal cap 10 is fixed to the end portion of the nut 4 by the bolt 12, a clearance is formed between the lubrication ring 7, the end surface of the nut 4 and the inner surface of the seal cap 10, and an axial movement of the lubrication ring 7 is limited.

Reference numeral 13 designates a garter spring. The garter spring 13 is a spring member of a ring shape in which a steel wire of spring steel, etc. is molded in a coil shape and its end portion is joined by welding, brazing, etc. or is molded and engaged in a hook shape. The garter spring 13 is fitted into a spring fitting groove arranged on the outer surface of each of both the ring pieces 7a, 7b and gives biasing force for biasing the ring pieces 7a, 7b in the axial direction.

Thus, when the screw shaft 2 is rotated, the inner surfaces of the ring pieces 7a, 7b come in slide contact with the outer surface of the screw shaft 2 by predetermined pressing force.

Reference numeral 14 designates a seal body. The seal body 14 is manufactured by a resin material, etc. and is engaged with a seal fitting portion 10a arranged in the seal cap 10 and is arranged so as to be screwed to the shaft rolling groove 3 of the screw shaft 2. The seal body 14 approximately comes in contact with the outer surface of the screw shaft 2 and the inner surface of the shaft rolling groove 3, and shows a comparatively high dust-preventing property.

The above shaft rolling groove 3 and the nut rolling groove 5 are connected by a connecting path of an unillustrated return tube, etc., and form a circulating rolling path. Plural rolling balls 6 and a predetermined amount of lubricant, e.g., grease are sealed into this circulating rolling path. Thus, the screw shaft 2 is screwed in the nut 4 so that the shaft rolling groove 3 and the nut rolling groove 5 are faced through the rolling ball 6. As the screw shaft 2 is rotated, the rolling ball 6 is rolled while the rolling ball 6 circulates the circulating rolling path.

In the lubricant-including polymer as one example of the lubricant-including material used in the lubrication ring 7, one or plural oils of paraffin system hydrocarbon oil of poly α-olefin oil, etc., naphthene system hydrocarbon oil, mineral oil, ether oil such as dialkyl diphenyl ether oil, etc., ester oil such as ester phthalate oil, etc. as the lubricant are mixed with synthetic resin selected from a group of polyolefin system resins such as polyethylene, polypropylene, polybutylene, polymethyl pentene, etc. The mixed raw material is heated and melted to a melting point or more of the resin, and is then cooled and solidified.

In this case, an additive such as an anti-oxidizing agent, a rust preventive, a wearing preventing agent, an anti-foaming agent, an extreme pressure agent, etc. may be added and used in advance in the above lubricant.

The above lubricant-including polymer is desirably set to a composition ratio in which the polyolefin system resin is set to 10 to 50 weight % and the lubricant is set to 90 to 50 weight %. The reasons for this are as follows. When the polyolefin system resin is less than 10 weight %, it is difficult to obtain required hardness and strength and maintain an initial shape when a load is applied. In contrast to this, when the polyolefin system resin exceeds 50 weight %, i.e., when the lubricant is less than 50 weight %, the supply amount of the lubricant is reduced and the life of the ball screw device 1 is reduced.

In the above group of synthetic resins, its average molecular weight ranges from 700 to $5\times10^6$. One or plural materials of a resin material classified into wax (e.g., polyethylene wax) of 700 to $5\times10^4$ in average molecular weight, a resin material having a comparatively low average molecular weight of $1\times10^4$ to $1\times10^6$, and a resin material having a super high average molecular weight of $1\times10^6$ to $5\times10^6$ are mixed and used in accordance with necessity.

When the material of the comparatively low molecular weight and the lubricant are combined, a lubricant-including polymer having constant mechanical strength, lubricant supply ability and oil holding property is obtained.

When one portion of this material of the comparatively low molecular weight is replaced with the material classified into wax, the mechanical strength is reduced, but the difference in molecular weight between the material classified into wax and the lubricant is small. Therefore, affinity for the lubricant is raised and the oil holding property of the lubricant-including polymer is improved and the lubricant can be supplied over a long period.

A hydrocarbon system material having a melting point ranging from 100 to 130° C., e.g., paraffin system synthetic wax may be also used as the wax in addition to the above polyolefin system material of polyethylene wax, etc.

On the other hand, when one portion of the comparatively low molecular weight material is replaced with the super high molecular weight material, the mechanical strength can be improved, but the difference in molecular weight between the super high molecular weight material and the lubricant becomes large. Therefore, the affinity for the lubricant is reduced and the oil holding property is reduced and the lubricant is rapidly exuded from the lubricant-including polymer. Therefore, the time until the supply amount of the lubricant becomes insufficient is shortened so that the life of the ball screw device 1 is reduced.

Therefore, when the balance of the molding property, the mechanical strength, the oil holding property and the lubricant supply amount is considered, the composition ratio of the lubricant-including polymer is desirably set such that the materials are combined in a range in which the material classified into wax has 0 to 5 weight %, and the comparatively low molecular weight material has 8 to 48 weight %, and the super high molecular weight material has 2 to 10 weight %, and the total of the three resins is set to 10 to 50 weight % and the lubricant is set to 90 to 50 weight %.

Further, the following thermoplastic resin and/or thermosetting resin may be also added to the above polyolefin system resin to improve the mechanical strength of the lubricant-including polymer of this embodiment.

A resin material such as polyamide, polycarbonate, a polybutylene terephthalate, polyphenylene sulfide, polyether sulfone, polyether ether ketone, polyamide imide, polystyrene, ABS resin (acrylonitrile-butadiene-styrene copolymer resin), etc. can be used as the thermosetting resin.

A resin material such as unsaturated polyester resin, urea resin, melamine resin, phenol resin, polyimide resin, epoxy resin, etc. can be also used as the thermosetting resin.

Further, a suitable compatible agent may be also added to disperse the polyolefin resin and resin except for this polyolefin resin in a more uniform state. One or plural materials of a filler, e.g., calcium carbonate, magnesium carbonate, inorganic whisker such as potassium titanate whisker, aluminum borate whisker, etc., an inorganic fiber such as a glass fiber, a metallic fiber, etc., a material obtained by weaving these inorganic fibers in a cloth shape, an organic compound such as carbon black and graphite powder, a carbon fiber, an aramid fiber, a polyester fiber, etc. may be also combined and added to further improve the mechanical strength.

Further, an anti-oxidizing agent such as N,N'-diphenyl-P-phenyldiamine, 2,2'-methylene-bis (4-methyl-6-t-butylphenol), etc. may be also added to prevent deterioration due to heat of the polyolefin system resin. An ultraviolet absorbent such as 2-hydoxy-4-n-octoxybenzophenon, 2 (2'-hydroxy-3'-t-butyl-5'-methyl-phenyl)-5-chlorobenzotriazole, etc. may be also added to prevent deterioration due to light.

The adding amount of all the additives except for the above polyolefin system resin and the lubricant may be desirably 20 weight % or less of the entire molding raw material as the entire additive to maintain the supply ability of the lubricant.

If the inner surface of the lubrication ring 7 using the above lubricant-including material comes in slide contact with the outer surface of the screw shaft 2 by the end portion of the nut 4, the lubricant is exuded from the lubrication ring 7 by frictional heat, etc. at that time and can be supplied to the shaft rolling groove 3, etc.

The operation of the ball screw device 1 will be explained.

In the ball screw device 1, the shaft rolling groove 3 of the screw shaft 2 and the nut rolling groove 5 of the nut 4 are opposed and screwed through the rolling ball 6. The ring pieces 7a, 7b of the lubrication ring 7 are opposed and assembled into the screw shaft 2 by the garter spring 13, and each of the ring pieces 7a, 7b is arranged in the end portion of the nut 4. The seal cap 10 is then fixed to the end portion of the nut 4 through the sleeve 11 by the bolt 12, and the lubrication ring 7 is engaged. Further, while the seal body 14 is screwed into the shaft rolling groove 3, the seal body 14 is engaged with the seal engaging portion 10a of the seal cap 10 by press-fitting or adhesion, etc., and is assembled.

When the screw shaft 2 is then rotated, the lubricant is exuded from the lubrication ring 7 coming in slide contact with the screw shaft 2, and is supplied to the outer surface of the screw shaft 2 and the shaft rolling groove 3.

At this time, the non-contact portion 8 digging the inner surface of the lubrication ring 7 therein is formed in each of the ring pieces 7a, 7b of the lubrication ring 7, and the contact area of the slide contact surface with the screw shaft 2 is reduced so that its frictional force is reduced. Further, the non-contact portion 8 functions as an oil reservoir of the exuded lubricant.

Therefore, the lubricating state is preferably held and the generation of the stick slip phenomenon is prevented even when the seal body 14 scratches off the lubricant of the outer surface of the screw shaft 2 in accordance with high speed rotation of the screw shaft 2, etc.

Further, the contact area of the slide contact surface is reduced at a starting time in suddenly accelerating the screw shaft 2 stopped in an insufficient lubricating state by the influence of the seal body 14, etc. Accordingly, its static frictional force is reduced and the induction of the stick slip phenomenon is prevented.

As explained above, in the embodiment, the non-contact portion 8 is formed in the lubrication ring 7 made of the lubricant-including material, and the lubrication ring 7 comes in slide contact with the screw shaft 2. Since the contact area of the slide contact surface with the screw shaft 2 is reduced, its frictional force is reduced and the non-contact portion can function as an oil reservoir of the exuded lubricant. Thus, when the screw shaft 2 is rotated at high speed and is suddenly accelerated and decelerated, the generation of the stick slip phenomenon is restrained and the generation of an abnormal sound can be prevented.

This is particularly effective when it is necessary to avoid the mixture of foreign matters such as dust, etc. and dust generation in a device such as a precision machine, etc. for performing the high speed rotation and/or the sudden acceleration and deceleration of the screw shaft 2.

Further, since the non-contact portion formed in the lubrication ring 7 is dug and formed in the axis perpendicular direction, a molding die is easily drawn at the molding time using injection molding, etc. and the lubrication ring 7 can be easily manufactured, and the life of the molding die can be improved.

The shape of the non-contact portion 8 of the lubrication ring 7 showing such effects is not limited to the slit shape of the circumferential direction shown in the embodiment, but may be also set to examples shown below.

EXAMPLE 1

Figure 5:
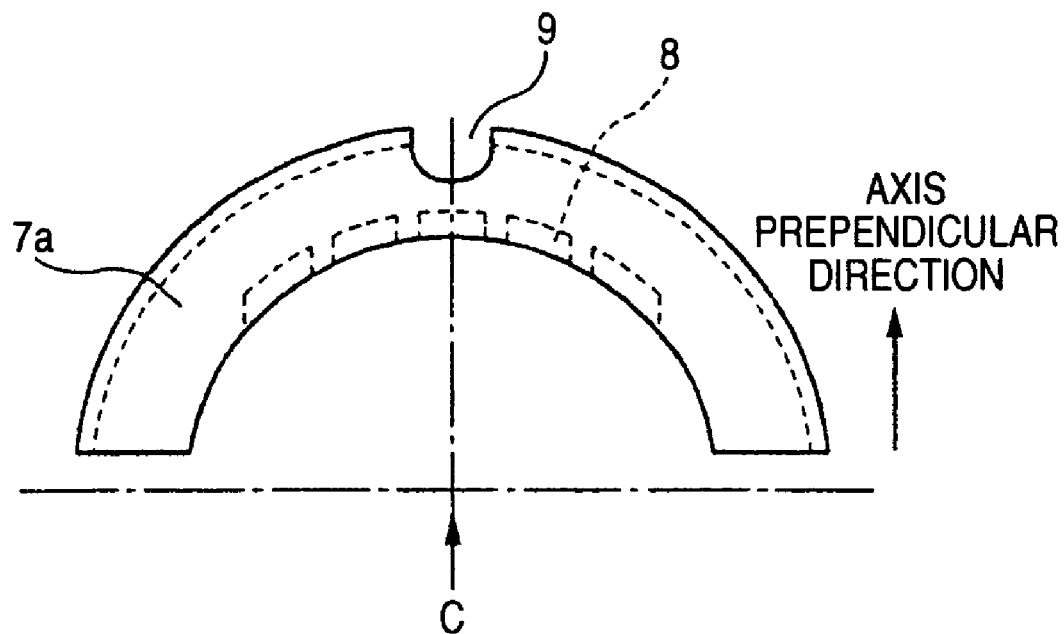
FIG. 5 is a front view showing example 1 of the ring piece.
Figure 6:
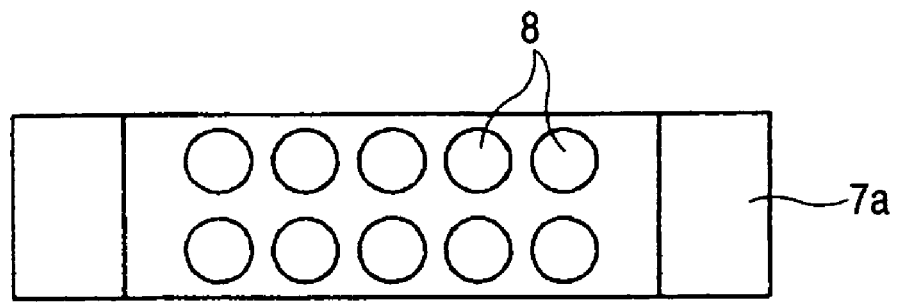
FIG. 6 is a view seen from an arrow C of FIG. 5.

FIG. 5 is a front view showing example 1 of the ring piece, and FIG. 6 is a view seen from an arrow C of FIG. 5.

Portions similar to those of the above embodiment are designated by the same reference numerals and their explanations are omitted.

A non-contact portion 8 of this example is approximately formed as a circular hole in which the inner surface of a ring piece 7a of the lubrication ring 7 is dug in the axis perpendicular direction. Plural non-contact portions 8 are arranged in two lines in the circumferential direction of the inner surface of the ring piece 7*a*. Plural non-contact portions 8 are similarly formed with respect to a ring piece 7*b*.

In this example, the reducing effect of the contact area of the above slide contact surface, the oil collecting effect and the die drawing property improving effect can be also obtained.

EXAMPLE 2

Figure 7:
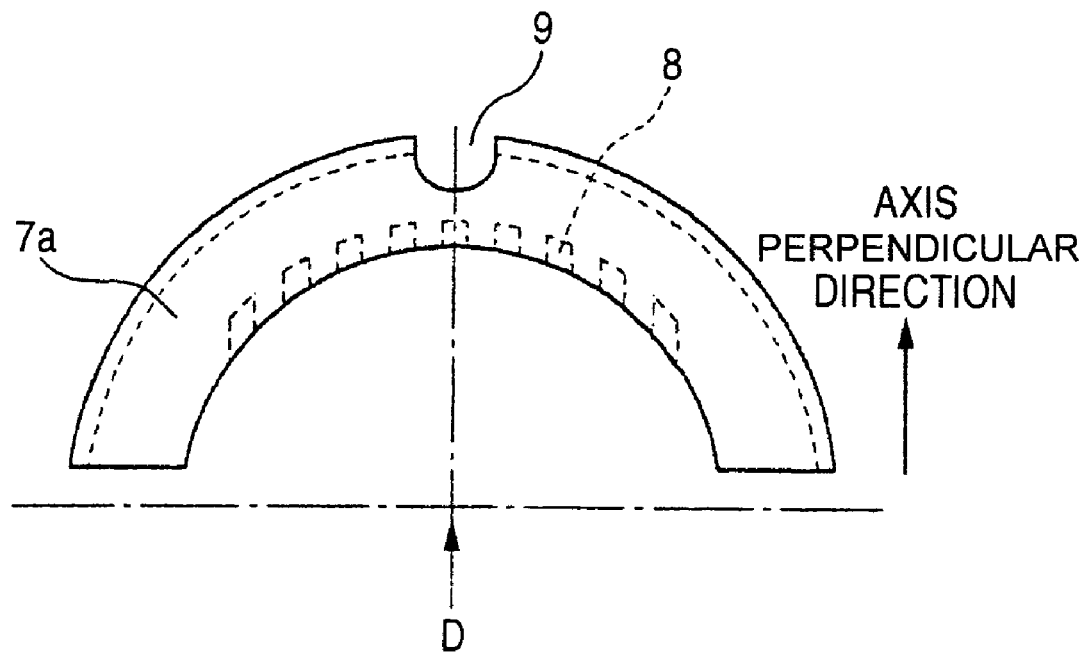
FIG. 7 is a front view showing example 2 of the ring piece.
Figure 8:
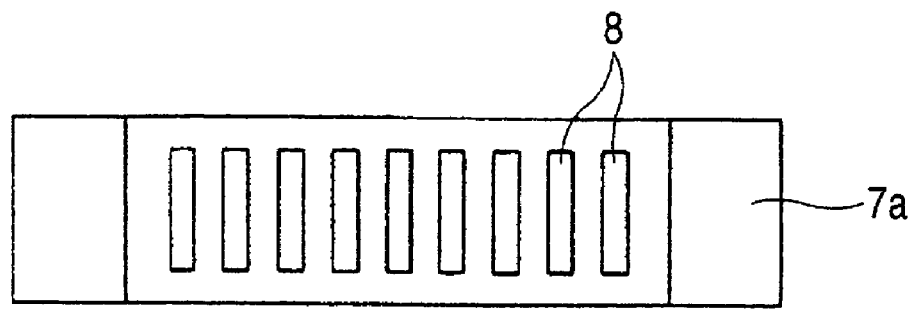
FIG. 8 is a view seen from an arrow D of FIG. 7.

FIG. 7 is a front view showing example 2 of the ring piece, and FIG. 8 is a view seen from an arrow C of FIG. 7.

Portions similar to those of the above embodiment are designated by the same reference numerals, and their explanations are omitted.

A non-contact portion 8 of this example is formed as a groove of a slit shape of the axial direction in which the inner surface of a ring piece 7*a* of the lubrication ring 7 is dug in the axis perpendicular direction. Plural non-contact portions 8 are arranged in the circumferential direction of the inner surface of the ring piece 7*a*. Plural non-contact portions 8 are similarly arranged with respect to a ring piece 7*b*.

In this example, the reducing effect of the contact area of the above slide contact surface, the oil collecting effect and the die drawing property improving effect can be also obtained.

In the above examples 1 and 2, the reducing effect of the contact area of the above slide contact surface and the oil collecting effect can be similarly obtained even when the digging direction of the non-contact portion 8 is set to the radial direction.

In the above embodiment, the circulating system of the rolling ball of the ball screw device is explained as the circulating system of the tube type for circulating the return tube as a connecting path. However, the circulating system is not limited to the tube type, but similar effects can be also obtained even in a circulating system in which the connecting path is set to an internal ball deflector type, an end cap type, etc.

Further, in the explanation of the embodiment, the nut is moved by rotating the screw shaft of the ball screw. However, similar effects can be also obtained even when the present invention is applied to the ball screw of a type for rotating the nut by fixing the screw shaft.

What is claimed is:

1. A ball screw device, comprising:

a screw shaft which has a shaft rolling groove in a spiral shape formed on an outer surface of the screw shaft;

a nut which has a nut rolling groove formed on an inner surface of the nut and opposed to the shaft rolling groove, wherein the screw shaft is to be screwed in the nut so that the shaft rolling groove and the nut rolling groove are faced through a plurality of rolling balls; and a lubrication ring, which is made of a lubricant-including material, comes in slide contact with the screw shaft and is arranged in an end portion of the nut, wherein a non-contact portion, which does not come in slide contact with the screw shaft, is formed in the slide contact surface of the lubrication ring, wherein the non-contact portion is configured from a plurality of grooves, which are arranged so as to extend in the axial direction, and have a slit shape width in the circumferential direction, and wherein the non-contact portion forms a space that is closed in the axial direction;

wherein the lubricating ring comprises a circumferential wall portion, and the non-contact portion is axially closed by the circumferential wall portion of the lubricating ring.

2. The ball screw device according to claim 1, wherein the circumferential wall portion is monolithically formed with the lubricating ring.

* * * * *